Jan. 3, 1967   J. P. SLATTERY   3,296,497
MOTOR STALL RESPONSIVE RELAY FOR LEVEL CONTROL DEVICES
Filed Feb. 25, 1964

INVENTOR.
JAMES P. SLATTERY
BY
*Merchant, Merchant & Gould*
ATTORNEYS

United States Patent Office 3,296,497
Patented Jan. 3, 1967

3,296,497
MOTOR STALL RESPONSIVE RELAY FOR
LEVEL CONTROL DEVICES
James P. Slattery, 6524 Walker St.,
Minneapolis, Minn. 55426
Filed Feb. 25, 1964, Ser. No. 347,303
1 Claim. (Cl. 317—123)

This invention pertains to indicating or control mechanisms and more particularly pertains to improvements in indicating or control mechanisms responsive to the occurrence of a predetermined condition.

It is frequently desirable in agricultural or industrial operations to determine when a storage tank or bin is full, or to automatically control the filling or emptying process. For example, in many such applications, such as the filling or emptying of grain storage tanks, the tanks are filled automatically by means of a conveyor system and it is imperative that the tank be equipped with a reliable, accurate level sensing device which will provide a control signal indicative of the full condition of the storage tank.

In the present invention a monitoring or sensing coil is mounted in inductive relation to the rotor of a shaded-pole induction motor and it has been discovered that when the rotor of the motor is rotating, a relatively high frequency magnetic field is generated which induces a relatively high frequency signal into the monitoring coil. This induced signal is not present when the motor rotor is stopped. The motor is mounted so that the motor shaft extends into the storage bin at the level to which the bin is to be filled. A paddle, or other similar damping device, is rigidly attached to the motor shaft. As the motor rotor rotates, the control signal is induced in the monitoring coil and this control signal is sent to a suitable control mechanism which energizes or de-energizes various relays, the state of the relays being indicative of whether or not the rotor of the motor is rotating.

As the storage bin is filled with grain, the level will eventually be reached where the paddle attached to the motor shaft will make contact with the level of the grain. The motor does not develop sufficient torque to force the paddle through the grain and hence the motor rotor will be stalled, or in other words, will stop rotating. At this time the induced signal in the monitoring coil will disappear, the control mechanism will be de-energized, and the relays will change states, thereby indicating that the grain level in the storage bin has reached a predetermined desired point.

It is an object of this invention, therefore, to provide an improved level sensing device.

Another object of this invention is to provide an improved level sensing, or control, device which has improved reliability.

A further object of this invention is to provide an improved control device which utilizes a magnetic field generated by the rotating rotor of a shaded-pole induction motor to generate a control signal.

These and other objects of my invention will become apparent to those skilled in the art upon consideration of the accompanying specification, claims and drawings, of which:

Figure 1:
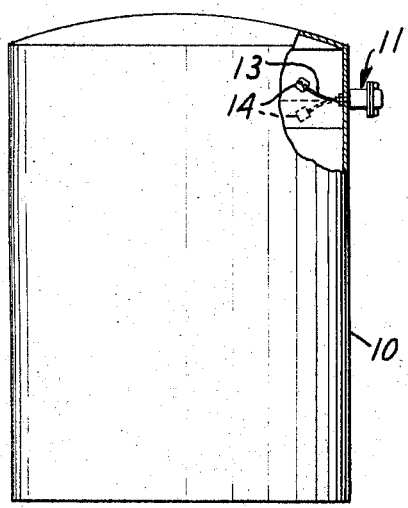
FIG. 1 is a side elevation of a storage tank with parts broken away to show the level sensing device of the present invention mounted therein.
Figure 2:
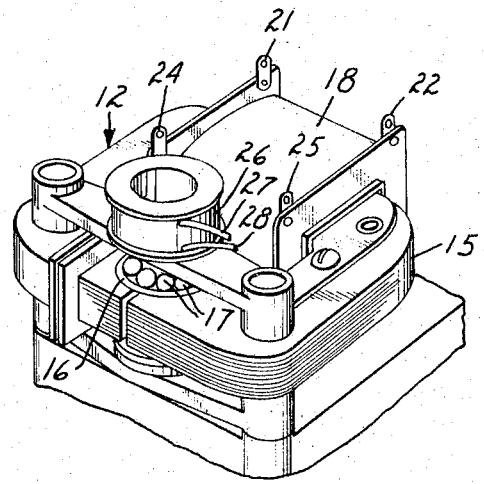
FIG. 2 is a perspective view showing the monitoring or sensing coil and the shaded-pole induction motor.
Figure 3:
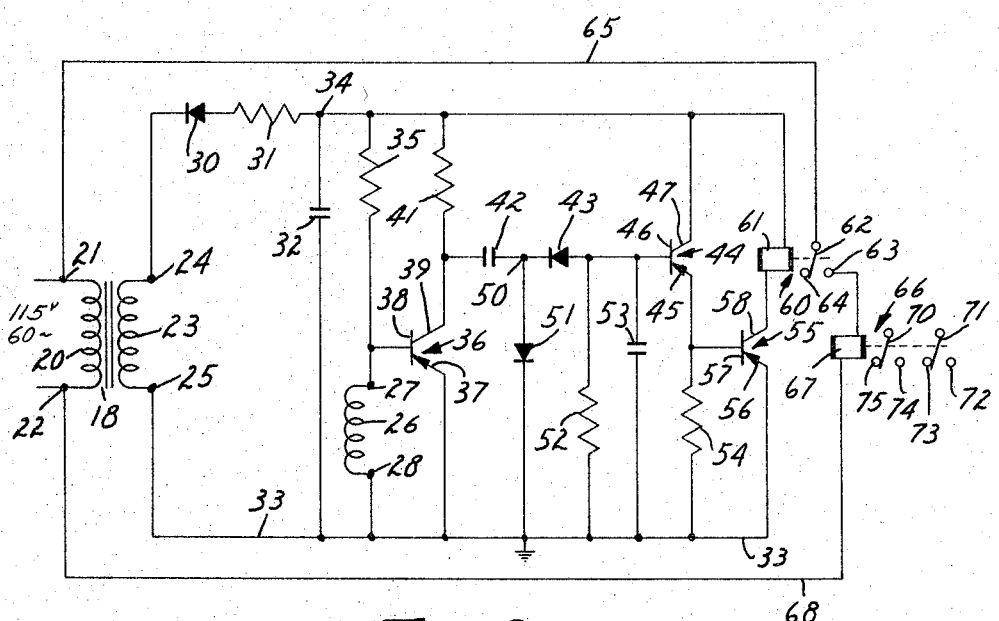
FIG. 3 is a schematic representation of the control mechanism of the present invention.

Referring to the figures, there is shown in FIG. 1 a side elevation of a storage tank, such as a grain storage tank, 10 having a level indicating or control device 11 mounted on the upper outside wall thereof at a predetermined level. Level indicating device 11 comprises a motor 12 having a shaft 13, the shaft 13 extending through the wall of the interior of tank 10. A paddle 14 is rigidly attached to shaft 13 and rotates inside of the tank when the rotor of motor 12 rotates.

The motor used in the level indicating device 11 is a single phase shaded-pole induction motor comprising a laminated stator 15 and a rotor 16. A plurality of conductors 17 are imbedded in rotor 16. Wound in inductive relationship around the stator 15 is a coil 18. Coil 18 has a primary winding 20, having end terminals 21 and 22, and a secondary winding 23 having end terminals 24 and 25.

A monitoring or sensing coil 26, having end terminals 27 and 28, is mounted in inductive relationship with one end of rotor 16 of motor 12.

End terminal 24 of secondary winding 23 is connected by means of a reverse pole diode 30, a resistor 31, a capacitor 32, and a common, or ground, conductor 33 to end terminal 25 of secondary winding 23.

A junction 34 between resistor 31 and capacitor 32 is connected by means of a resistor 35 to a base 38 of a transistor 36. Transistor 36 further has an emitter 37 and a collector 39. Base 38 is further connected to end terminal 27 of monitor coil 26, while end terminal 28 of coil 26 is connected to the ground conductor 33. Emitter 37 of transistor 36 is connected directly to the ground conductor 33, while collector 39 of transistor 36 is connected by means of a resistor 41 to the junction 34, and by means of a capacitor 42 in series with a reverse pole diode 43 to a base 46 of a transistor 44. Transistor 44 has an emitter 45 and a collector 47.

A junction 50 between capacitor 42 and diode 43 is connected by means of a diode 51 to the ground conductor 33. Base 46 of transistor 44 is connected by means of a resistor 52 in parallel with a capacitor 53 to the ground conductor 33. Collector 47 of transistor 44 is directly connected to junction 34, while emitter 45 of transistor 44 is connected by means of a resistor 54 to the ground conductor 33. Emitter 45 is further connected to a base 57 of a transistor 55. Transistor 55 has an emitter 56 which is connected directly to ground conductor 33, and a collector 58 which is connected by means of a relay winding 61 of a relay 60 to the junction 34. Relay 60 further has a movable contact 62, a fixed contact 63 and a fixed contact 64, movable contact 62 making contact with fixed contact 63 while relay 60 is energized and making contact with fixed contact 64 when relay 60 is de-energized.

Movable contact 62 of relay 60 is connected by means of a conductor 65 to the end terminal 21 of primary winding 20 of motor 12, while fixed contact 63 of relay 60 is connected by means of a relay winding 67 of a relay 66 and a conductor 68 to the end terminal 22 of primary winding 20. Relay 66 further has a movable contact 70, a movable contact 71, a fixed contact 72, a fixed contact 73, a fixed contact 74, and a fixed contact 75. When relay 66 is energized, movable contact 70 makes contact with fixed contact 74 and movable contact 71 makes contact with fixed contact 72; when relay 66 is de-energized, movable contact 70 makes contact with fixed contact 75 and movable contact 71 makes contact with fixed contact 73.

End terminals 21 and 22 of primary winding 20 of motor 12 are connected to a suitable alternating potential source, such as a 115 volt 60 cycle source.

In operation it has been found that when the rotor 16 of motor 12 is rotating, a relatively high frequency alternating signal is produced in the monitoring or sensing coil 26. By relatively high frequency signal induced in coil 26 is meant that the frequency of the induced signal is high relative to the 60 cycle signal which energizes the primary winding 20 of coil 18. The exact cause of the relatively high frequency signal induced in monitoring coil 26 is not yet fully understood; however, it is believed that the currents induced in the rotor conductors 17 by the alternating flux set up by stator 15, causes the individual rotor conductor 17 to operate like electro-magnets and as these conductors are rotated by the rotation of rotor 16 the magnetic field set up by conductors 17 cut the monitoring coil 26 and induce the high frequency signal. Regardless of the cause of the high frequency signal, it has been shown that this signal exists when the rotor 16 of motor 12 is rotating and does not exist when the rotor 16 is stopped.

When an alternating potential source is connected to primary winding 20 of coil 18, the alternating field set up around primary winding 20 induces an alternating magnetic flux into the laminated stator 15 of motor 12 in the conventional manner. In addition, since secondary winding 23 is wound in inductive relationship to primary winding 20 of coil 18, the alternating field set up around primary winding 20 induces an alternating signal into secondary winding 23. This signal is rectified by diode 30 and is filtered by resistor 31 and capacitor 32 to provide a negative D.C. potential source at junction 34. This negative D.C. potential source is used as the energizing potential for transistors 36, 44 and 55.

When no signal is induced in the monitoring coil 26, that is, when rotor 16 is stopped, transistors 44 and 55 are cut off and hence, relay winding 61 of relay 60 is de-energized and movable contact 62 is in engagement with fixed contact 64. Since movable contact 62 is in engagement with fixed contact 64, the energizing path for relay winding 67 of relay 66 is open circuited and hence, relay 66 is de-energized.

When rotor 16 of motor 12 rotates, an alternating signal is induced in monitoring coil 26 and this alternating signal is amplified by transistor 36 and is coupled through capacitor 42 to junction 50. The positive half cycles of the amplified alternating signal are shorted to ground by action of diode 51 while the negative half cycles are coupled through diode 43 to the base 46 of transistor 44 thereby causing transistor 44 to conduct. When transistor 44 conducts, the potential at its collector 45 moves in a negative direction and this negative going signal is coupled to the base 57 of transistor 55 thereby causing transistor 55 to conduct. When transistor 55 conducts, a current flows from the ground conductor 33 through emitter 56 to collector 58 of transistor 55, and relay winding 61 of transistor 60 to the negative potential of source at junction 34. This current flow energizes relay 60 and causes movable contact 62 to move into engagement with fixed contact 63. When movable contact 62 is in engagement with fixed contact 63, a current will flow from the end terminal 21 of primary winding 20 through conductor 65, movable contact 62 to fixed contact 63 of relay 60, relay winding 67, and conductors 68 to end terminal 22 of primary winding 20. This current flow will energize relay 66 and cause movable contact 70 to move into engagement with fixed contact 74 and movable contact 71 to move into engagement with fixed contact 72.

The contacts of relay 66 can be utilized to control the operation of additional mechanism. For example, if movable contact 70 and fixed contact 74 are connected in series with the power source for a conveyor system utilized to fill the grain storage bin 10, then as long as rotor 16 of motor 12 is turning, and an alternating signal is induced in monitoring coil 26, movable contact 71 will be in engagement with fixed contact 74, and the conveyor system can operate to fill storage tank 10 with grain. When the level of the grain in storage bin 10 reaches the level of paddle 14 of level indicator 11, the paddle will no longer be able to turn and the rotor 16 of motor 12 will stop. At this time a signal will no longer be induced in monitoring coil 26 and hence, relay 55 will cease conducting thereby de-energizing relay 60 and opening the energizing source to relay 66 thereby causing movable contact 70 to break engagement with fixed contact 74 and hence, stopping the conveyor system.

It can be seen that this level sensor operates in a fail-safe condition, that is, if any of the components fail, then the relay 67 will be de-energized thereby stopping the conveyor system.

It will be apparent that if a level sensing device, such as device 11 described above, were mounted at the bottom of the grain storage tank, then this level sensing device could be utilized to indicate when the storage tank is empty.

It is to be understood that while I have shown a specific embodiment of my invention, that this is for the purpose of illustration only and that my invention is to be limited solely by the scope of the appended claim.

What is claimed is:

Apparatus of the class described comprising:

(a) a motor having a rotor and a shaded-pole stator;
(b) a stator winding wound in inductive relation to said stator and adapted to be connected to a first source of energizing potential, said stator winding further having a secondary winding wound in inductive relation thereto whereby energization of said stator winding produces an alternating flux in said stator and an alternating potential in said secondary winding;
(c) monitor coil means inductively coupled to the rotor of said motor to produce a control signal indicative of rotation of said rotor;
(d) current control means having an input and an output and further having a conducting state and a nonconducting state;
(e) means for rectifying the alternating signal induced in said secondary winding to produce a second energizing potential source;
(f) relay means connecting the output of said current control means to said second energizing source, said relay having relay contacts; and
(g) means connecting the input of said current control means to said monitor coil, said control signal holding said current control means in its conducting state.

References Cited by the Examiner
UNITED STATES PATENTS 2,116,075 5/1938 Lenhart _____ 340—244 X
3,188,620 6/1965 MacCallum _____ 340—271 X LOUIS R. PRINCE, *Primary Examiner.*

S. C. SWISHER, *Assistant Examiner.*